(12) United States Patent
Wnuk (10) Patent No.: US 9,419,805 B2
(45) Date of Patent: Aug. 16, 2016

(54) GENERATING A CRL USING A SUB-SYSTEM HAVING RESOURCES SEPARATE FROM A MAIN CERTIFICATE AUTHORITY SUB-SYSTEM

(75) Inventor: Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 248 days.

(21) Appl. No.: 13/190,297

(22) Filed: Jul. 25, 2011

(65) Prior Publication Data

US 2013/0031363 A1 Jan. 31, 2013

(51) Int. Cl.
*H04L 9/32* (2006.01)
*H04L 29/06* (2006.01)

(52) U.S. Cl.
CPC .......... *H04L 9/3268* (2013.01); *H04L 63/0823* (2013.01)

(58) Field of Classification Search
CPC .. H04L 9/3263; H04L 9/3268; H04L 63/0823
USPC ....................................................... 713/158
See application file for complete search history.

(56) References Cited

U.S. PATENT DOCUMENTS

| | | | | |
|---|---|---|---|---|
| 6,128,740 A * | 10/2000 | Curry et al. | .................... | 713/158 |
| 7,124,295 B1 * | 10/2006 | Zhao | .................... | H04L 63/0823 |
| | | | | 713/156 |
| 7,356,693 B2 * | 4/2008 | Kivinen | .................. | H04L 9/006 |
| | | | | 713/155 |
| 8,195,935 B2 * | 6/2012 | Tian | ........................ | H04L 63/06 |
| | | | | 713/158 |
| 8,954,742 B2 * | 2/2015 | Moreira | ................ | G06F 21/645 |
| | | | | 713/155 |
| 2002/0156863 A1 * | 10/2002 | Peng | .............................. | 709/217 |
| 2003/0037234 A1 * | 2/2003 | Fu et al. | ......................... | 713/158 |
| 2006/0015870 A1 * | 1/2006 | Loboz | ..................... | G06F 9/505 |
| | | | | 718/100 |
| 2006/0168584 A1 * | 7/2006 | Dawson et al. | ................ | 718/104 |
| 2006/0242210 A1 * | 10/2006 | Ring et al. | ..................... | 707/204 |
| 2007/0240161 A1 * | 10/2007 | Prabhakar | ............. | G06F 9/5044 |
| | | | | 718/104 |
| 2009/0113543 A1 * | 4/2009 | Adams et al. | ................... | 726/18 |
| 2009/0187983 A1 * | 7/2009 | Zerfos et al. | .................... | 726/10 |

* cited by examiner

*Primary Examiner* — Linglan Edwards
(74) *Attorney, Agent, or Firm* — Lowenstein Sandler LLP (57) ABSTRACT

A server computing system initiates a first sub-system to generate a certificate revocation list (CRL) using resources that are separate from resources of a second sub-system that performs certificate authority (CA) management functions other than generating a CRL. The first sub-system receives a command from the second sub-system to update revocation data in a cache that is coupled to the first sub-system and generates a CRL using the updated revocation data in the cache. The first sub-system provides the CRL to the second sub-system.

14 Claims, 7 Drawing Sheets

FIG. 7 ość# GENERATING A CRL USING A SUB-SYSTEM HAVING RESOURCES SEPARATE FROM A MAIN CERTIFICATE AUTHORITY SUB-SYSTEM

TECHNICAL FIELD

Embodiments of the present invention relate to certificate revocation lists (CRLs). Specifically, the embodiments of the present invention relate to a method and system for generating a CRL using a sub-system that has resources separate from a main CA (certificate authority) sub-system.

BACKGROUND

A certificate system provides a security framework to ensure that network resources are accessed by authorized users. The certificate system is capable of generating digital certificates for different users to verify the identity of a presenter. The certificate system can include a Certificate Authority (CA) sub-system to issue and revoke certificates. Revoked certificates are certificates that are no longer valid and should no longer be relied upon. A certificate revocation list (CRL) is a list of the revoked certificates and is published by the CA that issued the certificates. A CRL tends to grow rapidly and can include millions of certificates, and the generation of a CRL consumes much of a CA sub-system's resources. Traditionally, a CRL is generated from a database, which is a slow and time-consuming process. Another traditional solution stores all of the revoked certificates in the cache of the CA sub-system and generates CRL from the CA sub-system's cache, which is on average 100 times faster than generating a CRL from a database. However, encoding data from a cache also consumes much of a CA sub-system's resources. A CA sub-system is also busy handling requests to perform other CA management functions, such as to issue, generate, and revoke certificates. The generation of the CRLs and the handling of a large number of CA management requests can greatly burden the CA sub-system resources, and thus, have a negative affect on the performance of a CA sub-system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for generating a certificate revocation list (CRL) using a sub-system having resources that are separate from a certificate authority (CA) sub-system. A server computing system initiates a first sub-system to generate a CRL using resources that are separate from resources of a second sub-system that performs CA management functions other than generating a CRL. The first sub-system receives a command from the second sub-system to update revocation data in a cache that is coupled to the first sub-system and generates a CRL using the updated revocation data in the cache. The first sub-system provides the CRL to the second sub-system. Embodiments of the present invention speed up CRL generation and improve the performance of a CA sub-system by using resources of a different sub-system for generating CRLs.

Figure 1:
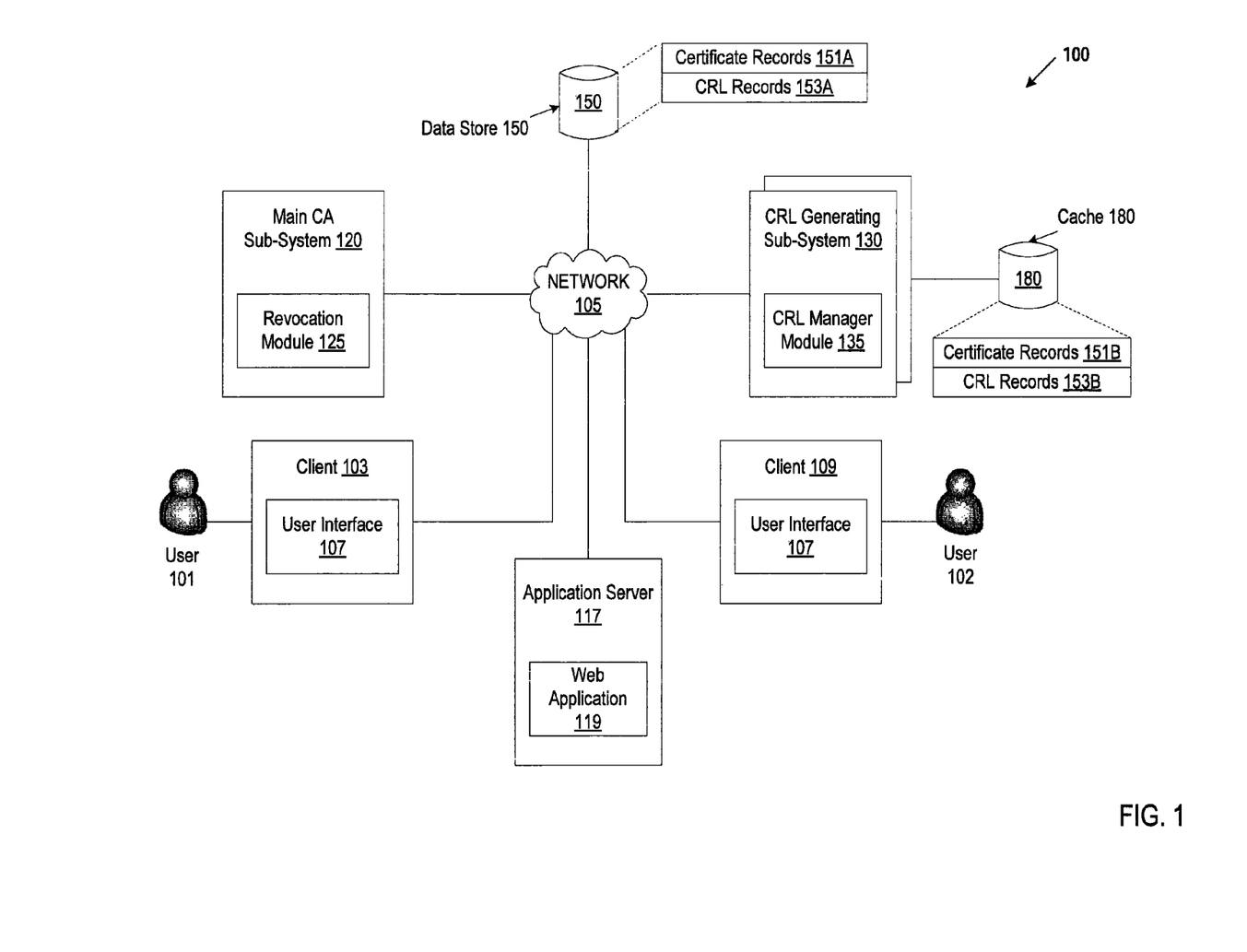
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more main Certificate Authority (CA) sub-systems 120, one or more CRL generating sub-systems 130, one or more clients 103,109, and one or more application servers 117 communicating via a network 105. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

An application server 117 can host one or more applications, such as web applications 119. A web application 119 can be a HTTPS (hypertext transfer protocol secure) based web application to provide encrypted communication and secure identification of an application server 117. Digital certificates may be used for HTTPS-based web applications 119. A digital certificate can be a digital SSL certificate, such as an X.509 certificate. A digital certificate is also hereinafter referred to as a certificate. An application server 117 can be issued a certificate and a client 109, which hosts a web browser or similar application, can validate that an application server 117 is authentic, such that a user 102 can feel secure that his/her interaction with the web application 119 has no eavesdroppers and that the web application 119 is who it claims to be. An application server 117 can be any type of computing device including server computers, desktop computers, laptop computers, hand-held computers, or similar computing device. A client 109 can be a smart hand-held device or any type of computing device including desktop computers, laptop computers, mobile communications devices, cell phones, smart phones, hand-held computers or similar computing device.

A main CA sub-system 120 can be a server. The server can be any type of computing device including server computers, desktop computers, laptop computers, hand-held computers, or similar computing device. A main CA sub-system 120 can generate and issue certificates to entities, such as an application servers 117 and users 102, which requested them. The main CA sub-system 120 can maintain certificate records 151A for the issued certificates in a data store 150 that is coupled to the main CA sub-system 120. The certificate records 151A can contain status data indicating whether a certificate is valid, revoked, or expired, as well as additional information pertaining to a certificate. The data store 150 can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

A digital certificate may be revoked. A certificate may be revoked for various reasons, such as the private key associated with the certificate was compromised, the private key associated with the main CA sub-system 120 that issued the certificate was compromised, the owner of the certificate is no longer affiliated with the issuer, etc. The main CA sub-system 120 can receive a request to revoke a particular certificate. For example, a user 101, such as a system administrator, can use a user interface 107 hosted by a client 103 to send a revocation request to the main CA sub-system 120. The user interface 107 can be an administrator user interface. A client 103 can be a smart hand-held device or any type of computing device including desktop computers, laptop computers, mobile communications devices, cell phones, smart phones, hand-held computers or similar computing device. In another example, a user 101, such as an agent, can send a revocation request to the main CA sub-system 120. The user interface 107 can be an agent user interface. In another example, a user 102, such as an owner of a digital certificate, can use a user interface 107 hosted by a client 109 to send a revocation request to the main CA sub-system 120 to revoke a certificate. The user interface 107 can be an end entity interface. The main CA sub-system 120 can receive a revocation request and update the status data pertaining to a certificate record 151A in the data store 150 of a certificate that is being revoked.

A client 103,109 or an application server 117 may need to determine the status of a certificate, such as whether the certificate is valid or has been revoked. For example, a user 102 may use a client 109 to browse a company website store, which is a web application 119 hosted by an application server 117, to make a purchase. A web browsing application on the client 109 may need to verify the validity of an SSL certificate of the company website store prior to a user 102 making a purchase. In another example, an application server 117 may host a banking web application 119. A user 102 may use a client 109 to attempt to login to the banking web application 119 using a certificate to access a bank account. Prior to granting account access to the user 102, the application server 117 may need to determine whether the certificate of a user 102 is valid or has been revoked.

A CRL generating sub-system 130 can generate a CRL, which clients 103,109 and application servers 117 can use to determine the status of a certificate. The CRL generating sub-system 130 can be a server. The server can be any type of computing device including server computers, desktop computers, laptop computers, hand-held computers, or similar computing device. The CRL generating sub-system 130 can be coupled to the data store 150 and store a CRL as part of a CRL record 153A in the data store 150. A CRL is a publicly available list of certificates that have been revoked. There can be one CRL record 153A for each CRL generating sub-system 130.

The CRL generating sub-system 130 can have resources, such as memory and CPU (central processing unit) resources, that are separate from the main CA sub-system 120. A sub-system that is dedicated to generating CRLs is hereinafter referred to as a 'CRL generating sub-system'. A CRL generating sub-system 130 can generate CRLs using a cache 180 that is coupled to the CRL generating sub-system 130. A main CA sub-system 120 can perform CA management functions other than generating CRLs, such as receiving a request for a digital certificate, generating a digital certificate, issuing a digital certificate, receiving certificate revocation requests from a client 103,109 and/or an application server 117, updating certificate records 151A that are stored in the data store 150, reading CRL records 153A that are stored in the data store 150, publishing CRLs, etc. A sub-system that is configured to update certificate records stored in the data store 150 and to perform at least one CA management function other than generating a CRL is hereinafter referred to as a 'main CA sub-system'. The cache 180 can store data, such as certificate records 151B and a CRL record 153B, for generating a CRL. The main CA sub-system 120 can include a revocation module 125 to communicate with a CRL manager module 135 to synchronize the data between the certificate records 151B and CRL record 253B in the cache 180 and the data in the certificate records 151A and CRL record 153A in the data store 150. The CRL manager module 135 can use the data in the cache 180 to quickly generate a CRL, without using any resources (e.g., main memory, CPU) of the main CA sub-system 120. The main CA sub-system 120 and the CRL generating sub-system 130 can establish secure communication by authenticating one another using certificates that are issued to them. The data communicated over the secure connection can be encrypted. For example, the connection between the main CA sub-system 120 and the CRL generating sub-system 130 can be a HTTPS connection over SSL (secure socket layer) with client authentication using a certificate.

The revocation module 125 can receive revocation requests for revoking certificates and can update the certificate records 151A in the data store 150. The revocation module 125 can pass information to the CRL manager module 135, which the CRL manager module 135 can use to update the cache 180 data and generate a CRL based on the updated data in the cache 180. For example, the revocation module 125 receives a request to revoke Certificate Serial No. 69507312 and updates the certificate record 151A for Certificate Serial No. 69507312 in the data store 150 to indicate that Certificate Serial No. 69507312 is now revoked. The revocation module 125 sends a command to cause the CRL manager module 135 to update the certificate record 151B for Certificate Serial No. 69507312 in the cache 180 and can generate a CRL that includes the Certificate Serial No. 69507312 in the CRL.

The CRL manager module 135 can generate a new CRL by updating a CRL record 153B in the cache 180 and can store the new CRL in the data store 150 as part of the CRL record 153A. The main CA sub-system 120 can have read access to the CRL records 153A. A client 103,109 and/or application server 117 may send a request to the main CA sub-system 120 for a copy of a CRL and the main CA sub-system 120 can provide the CRL to the client 103,109 and/or application server 117. The client 103,109 and/or application server 117 can then locally store a copy of the CRL, and search the local CRL for a certificate to determine whether the certificate is valid or has been revoked.

The main CA sub-system 120 can also publish a CRL to a file, to an online certificate status protocol (OCSP) responder server, and/or to a central repository (e.g., a Lightweight Directory Access Protocol repository). The network architecture 100 can include one or more OCSP responder servers (not shown) for hosting an OCSP service for verifying the status of a certificate. A client 103,109 and application server 117 can use a published CRL to determine the status of a certificate.

Figure 2:
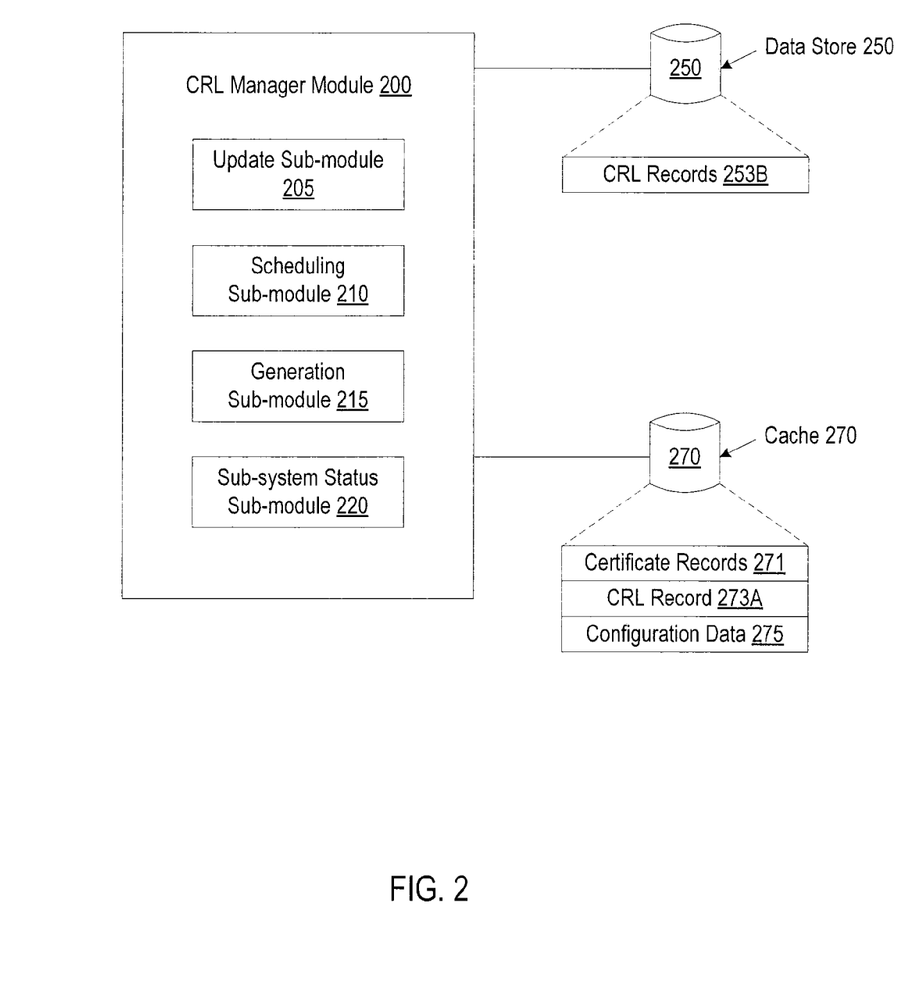
FIG. 2 is a block diagram of one embodiment of a CRL (certificate revocation list) manager module for generating a CRL using a sub-system that has resources separate from a main CA (certificate authority) sub-system.

FIG. 2 is a block diagram of one embodiment of a CRL manager module 200 for generating a CRL using a sub-system that has resources separate from a main CA sub-system. The CRL manager module 200 may be the same as the CRL manager module 135 in a CRL generating sub-system 130 of FIG. 1. The CRL manager module 200 can include an update sub-module 205, a scheduling sub-module 210, a generation sub-module 215, and a sub-system status sub-module 220.

The update sub-module 205 can receive commands from a main CA sub-system to update data that is stored in a cache 270 that is coupled to the update sub-module 205. The command may be for the update sub-module 205 to update revocation data, such as particular certificate records 271 that are stored in the cache 270. Each certificate record 271 can have status data that describes the status of the corresponding certificate. The status data can include, for example, a serial number of a certificate, a name of the CA that issued the certificate, the owner of the certificate, and the current certificate status. Examples of the current status can include, and are not limited to 'valid,' 'expired,' 'revoked,' and 'unknown.' In one example, the update sub-module 205 may receive an Update-Revocation command to change the current status for the certificate record 271 for Certificate Serial No. 3821987 to 'revoked'. The command can include one or more attributes that have names and values that describe which certificate record 271 to update and the data to be changed. The command can also include additional revocation data, such as a serial number, a revocation date, a description of a reason for revoking the certificate, and an invalidity period. The update sub-module 205 can update the revocation data (e.g., certificate records 271) based on the attributes in the command.

In another example, the command may be for the update sub-module 205 to update configuration data 275 that is stored in the cache 270. The configuration data 275 can be a configuration file. The configuration data 275 can describe which elements should be included in a CRL and a CRL record, such as which certificate extensions should be included in a CRL. The configuration data 275 can also include a schedule for generating a CRL. For example, the schedule may be to generate a CRL every 4 hours and/or at a scheduled time. The command can include one or more attributes that have names and values which describe what aspects of the configuration data 275 should be changed. For example, the update sub-module 205 receives a Modify-Configuration command to change which extensions should be included in the CRL. In another example, the Modify-Configuration command is to change the schedule for generating a CRL. The update sub-module 205 can update the configuration data 275 based on the attributes in the command.

The scheduling sub-module 210 can use the schedule to trigger the generation sub-module 215 to generate a CRL. In one embodiment, the scheduling sub-module 210 places the CRL manager module 200 in a sleep mode until the CRL manager module 200 is scheduled to generate a CRL or until the CRL manager module 200 receives a command from a main CA sub-system. The generation sub-module 215 can use the data in the cache 270, such as the certificate records 271 and the configuration data 275, to update a CRL record 273 that is stored in the cache 270 to generate a CRL. A CRL record 273A can include, for example, and is not limited to, a list of certificates that are revoked (CRL), the serial number of the certificates in the list, information of when the CRL record was generated, a CRL identifier (e.g., a CRL serial number), size of the CRL, cache information, a Delta CRL listing changes since the last CRL was generated, a Delta CRL identifier, a size of the Delta CRL, etc. The generation sub-module 215 can also receive a command from a main CA sub-system to generate a CRL. A command to generate a CRL can override a schedule. The generation sub-module 215 can store a copy of the updated CRL record 273A as a CRL record 273B in a data store 250 that is coupled to the generation sub-module 215. A main CA sub-system that is coupled to the data store 250 can read the CRL record 273B to identify which certificates are revoked.

The sub-system status sub-module 220 can receive a request from a main CA sub-system requesting the status of the CRL generating sub-system. The sub-system status sub-module 220 can generate and send a status response to the main CA sub-system. The status response can include, for example, data indicating whether the CRL generating sub-system is busy performing an action (e.g., busy updating the cache, busy generating a CRL, not busy, etc.), data describing the most recent action taken, the time the action was performed, the amount of time taken to perform the action, the serial number of the last generated CRL, and the scheduled time to generate a next CRL.

Figure 3:
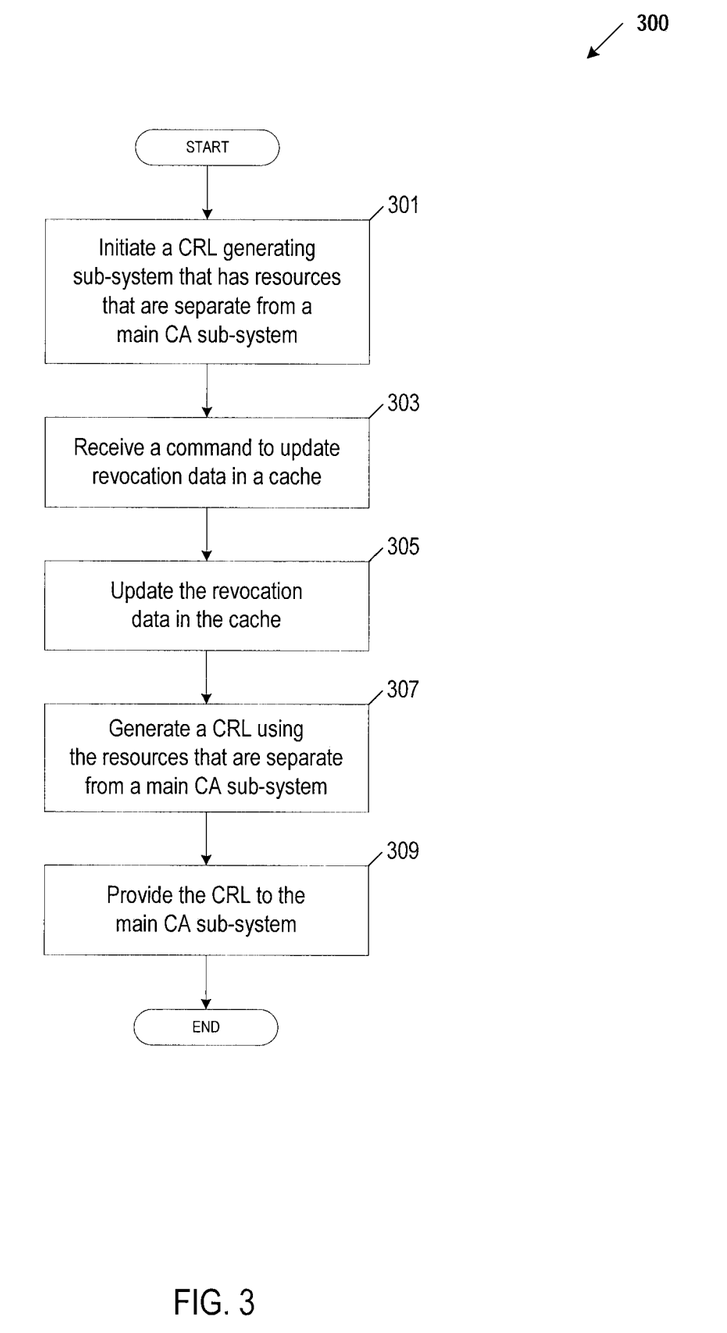
FIG. 3 is a flow diagram which illustrates an embodiment of a method for generating a CRL using a sub-system that has resources separate from a main CA sub-system.

FIG. 3 is a flow diagram which illustrates an embodiment of a method 300 for generating a CRL using a sub-system that has resources separate from a main CA sub-system. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the CRL manager module 135 in a CRL generating sub-system 130 of FIG. 1.

In one embodiment, the method 300 starts with initiating a sub-system that is dedicated to generating CRLs, such as a CRL generating sub-system, at block 301. The CRL generating sub-system has resources, such as memory and CPU resources, that are separate from the resources of a main CA sub-system. The CRL generating sub-system can be initiated, for example, via an init script that is executed at startup by a server hosting the CRL generating sub-system. At block 303, the CRL manager module receives a command from a main CA sub-system to update revocation data (e.g., certificate records) in a cache that is coupled to the CRL manager module. The command can include attributes that have names and values that describe which certificate record to update and the data in the certificate record that should be changed. For example, the CRL manager module receives an Update-Revocation command to change the status data for the certificate records for Certificate Serial No. 1597773 and Certificate Serial No. 8675309 from 'valid' to 'revoked'. At block 305, the CRL manager module updates the revocation data (e.g., certificate records) in the cache.

At block 307, the CRL manager module determines that it is time to generate a CRL and generates a CRL using the resources (e.g., revocation data in the cache, CPU resources) that are separate from the main CA sub-system. The CRL manager module can generate CRLs without being configured to perform other CA management functions that are performed by the revocation module in the main CA sub-system. The CRL manager module can be triggered to generate a CRL based on a schedule and/or by receiving a command from the main CA sub-system to generate a CRL. The CRL manager module can generate a full CRL or a delta CRL. A full CRL can contain a record of all of the revoked certificates since the main CA sub-system began storing and updating certificate records in a data store that is coupled to the main CA sub-system. A delta CRL can contain a record of all of the revoked certificates since the last CRL (full or delta) was generated by the CRL generating sub-system. A CRL can include a list of serial numbers for the revoked certificates and a name of the CRL generating sub-system that generated the CRL. The CRL manager module can generate a CRL by updating a CRL record that is stored in the cache.

At block 309, the CRL manager module provides the CRL to at least one main CA sub-system. The CRL manager module can store the CRL in a data store that is coupled to the main CA sub-system, which can read the CRL from the data store to identify which certificates are revoked. At any time, the CRL manager module may receive a status request from a main CA sub-system, and the CRL manager module can respond with a status response. For example, after the CRL manager module updates the revocation data in its cache and prior to the CRL manger module determining that it is time to generate a new CRL, the CRL manager module may receive a status request. The CRL manager module can send a response indicating that its cache was updated at 3:00 pm and a new CRL is scheduled to be generated at 4:00 pm. In another example, after the CRL manager module generates the CRL, the CRL manager module may receive a status request. The CRL manager module can send a response indicating that it is currently not busy, has finished generating CRL Serial No. 14 at 4:00 pm, and the amount of time it took to generate CRL Serial No. 14 in the response.

Figure 4:
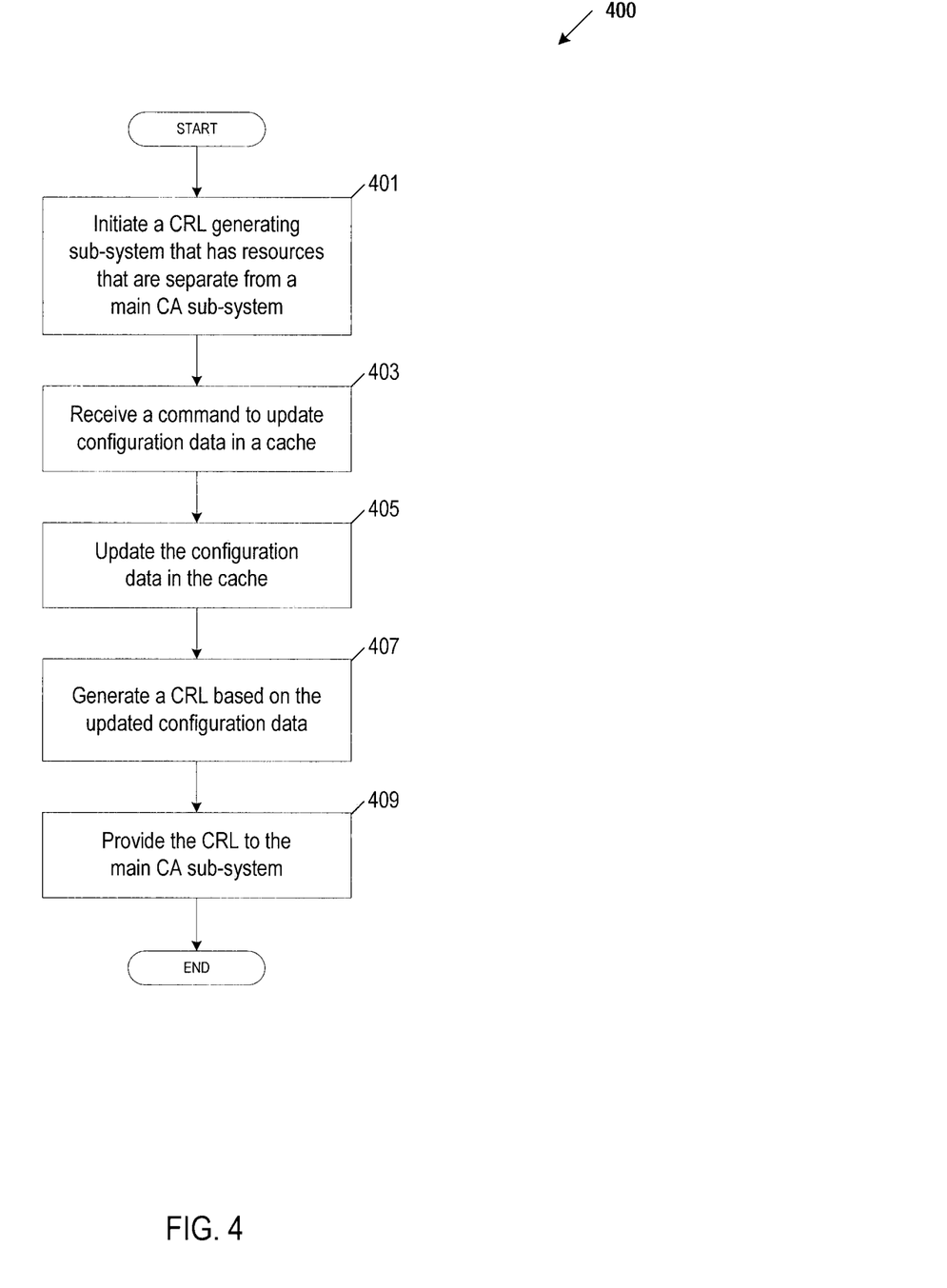
FIG. 4 is a flow diagram which illustrates an embodiment of a method for generating a CRL based on modified configuration data using a sub-system that has resources separate from a main CA sub-system.

FIG. 4 is a flow diagram which illustrates an embodiment of a method 400 for generating a CRL based on modified configuration data using a sub-system that has resources separate from a main CA sub-system. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the CRL manager module 135 in a CRL generating sub-system 130 of FIG. 1.

In one embodiment, the method 400 starts with initiating a sub-system that is dedicated to generating CRLs, such as a CRL generating sub-system, at block 401. At block 403, the CRL manager module receives a command from a main CA sub-system to update configuration data in a cache that is coupled to the CRL manager module. For example, the CRL manager module receives a Modify-Configuration command to change the certificate extensions that should be included in the CRL. In another example, the Modify-Configuration command is to change the schedule for generating a CRL. At block 405, the CRL manager module updates the configuration data in the cache.

At block 407, the CRL manager module generates a CRL based on the updated configuration data in the cache. For example, if the updated configuration data changes the extensions that should be included in the CRL, the CRL manager module generates a CRL that has the extensions as specified by the updated configuration data. At block 409, the CRL manager module provides the CRL to the main CA sub-system. The CRL manager module can store the CRL (e.g., the updated CRL record) in a data store that is coupled to the main CA sub-system. At any time, the CRL manager module may receive a request from a main CA sub-system to provide a configuration. The request can be a Get-Configuration command. The CRL manager module can respond by providing configuration data that is stored in the cache to the main CA sub-system. For example, the CRL manager module can send a configuration file to the main CA sub-system.

Figure 5:
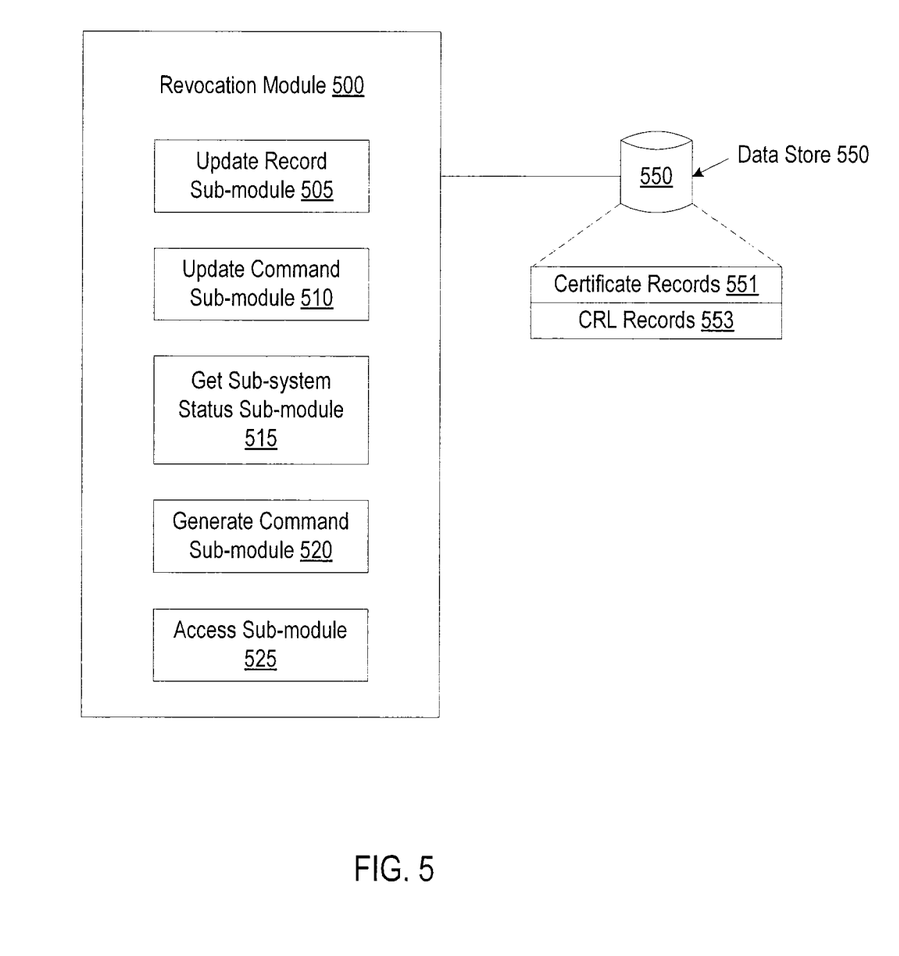
FIG. 5 is a block diagram of one embodiment of a CRL system for using a sub-system that has resources separate from a main CA sub-system to generate a CRL.

FIG. 5 is a block diagram of one embodiment of a revocation module 500 for using a sub-system that has resources separate from a main CA sub-system to generate a CRL. The revocation module 500 may be the same as the revocation module 125 in a main CA sub-system 120 of FIG. 1. The revocation module 200 can include an update record sub-module 505, and update command sub-module 510, a get system status sub-module 515, a generate command sub-module 520, and an access sub-module 525.

The update record sub-module 505 can receive revocation requests from a client and/or an application server to revoke one or more certificates. A request can include a certificate identifier (e.g., serial number) of the certificate to be revoked. The update record sub-module 505 can update a certificate record, which corresponds to the certificate identifier in the request, in the a data store 550 that is coupled to the update record sub-module 505. The update command sub-module 510 can send commands to a CRL generating sub-system to cause the CRL generating sub-system to update data in a cache that is coupled to the CRL generating sub-system. Example commands, can include and are not limited to, a command to update revocation data (e.g., certificate records) in the cache and a command to update configuration data in the cache. The command can include attributes that have names and values that describe which data should be updated and what data to change. The update command can include an identifier of the CRL generating sub-system that should receive the update command.

The get system status sub-module 515 can send a request to a CRL generating sub-system for the status of the CRL generating sub-system and can receive a status response. The status request can include an identifier of the CRL generating sub-system that is being queried. The generate command sub-module 520 can send a command to a CRL generating sub-system to generate a CRL. The command can override a schedule for generating CRLs. The command to generate a CRL can include an identifier of the CRL generating sub-system that should receive the command. The access sub-module 525 can read the CRL records 553 that are stored in a data store 550 that is coupled to the access sub-module 525 to determine whether a certificate is valid or not. The CRL records 553 is data that is generated by one or more CRL generating sub-systems. The access sub-module 525 can publish a CRL that is included in a CRL record 553, which clients and/or applications can then use to determine whether a certificate is valid or has been revoked. The access sub-module 525 can publish a CRL to a file, to an OCSP responder server, and/or to a central repository (e.g., a LDAP repository) to notify users that the certificates in the CRL are no longer valid.

Figure 6:
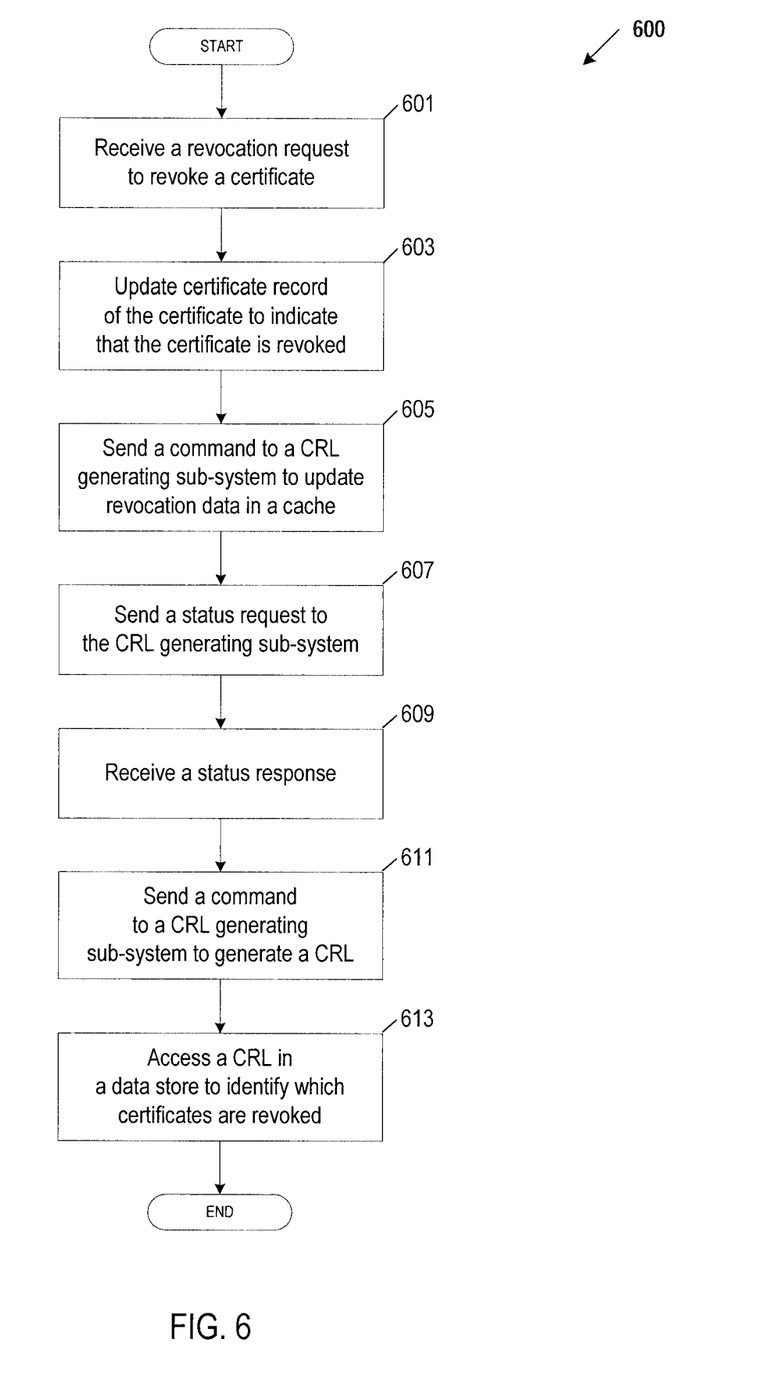
FIG. 6 is a flow diagram which illustrates an embodiment of a method for using a sub-system that has resources separate from a main CA sub-system to generate a CRL.

FIG. 6 is a flow diagram which illustrates an embodiment of a method 600 for using a sub-system that has resources separate from a main CA sub-system to generate a CRL. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the revocation module 125 in a main CA sub-system 120 of FIG. 1.

In one embodiment, the method 600 starts with the revocation module receiving a revocation request to revoke a certificate from a client and/or application server at block 601. The request can include a certificate identifier (e.g., serial number) of the certificate to be revoked. At block 603, the revocation module updates a certificate record, which corresponds to the certificate identifier in the request, in the a data store that is coupled to the revocation module. At block 605, the revocation module can detect a CRL generating sub-system and sends a command to a CRL generating sub-system to cause the CRL generating sub-system to update revocation data (e.g., certificate records) in a cache that is coupled to the CRL generating sub-system. The command can include attributes that have names and values that describe which certificate records in the cache should be updated and what data pertaining to the certificate records to change. For example, the revocation request is to revoke Certificate Serial No. 5256334. The command can be an Update-Revocation command that has attribute names and values that indicate that the certificate record in the cache for Certificate Serial No. 5256334 should have a status of 'revoked.'

At any time, the revocation module can send a status request to a CRL generating sub-system. For example, at block 607, the revocation module sends a status request to the CRL generating sub-system after the revocation module sent the Update-Revocation command and receives a status response at block 609. At any time, the revocation module can send a command to a CRL generating sub-system to generate a CRL. For example, at block 611, the revocation module sends a Generate-CRL command to the CRL generating sub-system. The revocation module may send a generate CRL command in response to receiving the status of the CRL generating sub-system. For instance, the revocation module receives a status response indicating that the CRL generating sub-system has updated its cache, but has not yet generated a new CRL. The CRL that is currently stored in a data store that is coupled to the revocation module is not up-to-date and the revocation module is at risk of reading the out-dated CRL. The revocation module can send the Generate-CRL command to the CRL generating sub-system to cause the CRL generating sub-system to generate a new CRL based on updated data in the cache. The CRL generating sub-system can store the new CRL in a data store that is coupled to the revocation module and the revocation module can reliably access the new CRL in the data store to identify which certificates are revoked at block 613.

Figure 7:
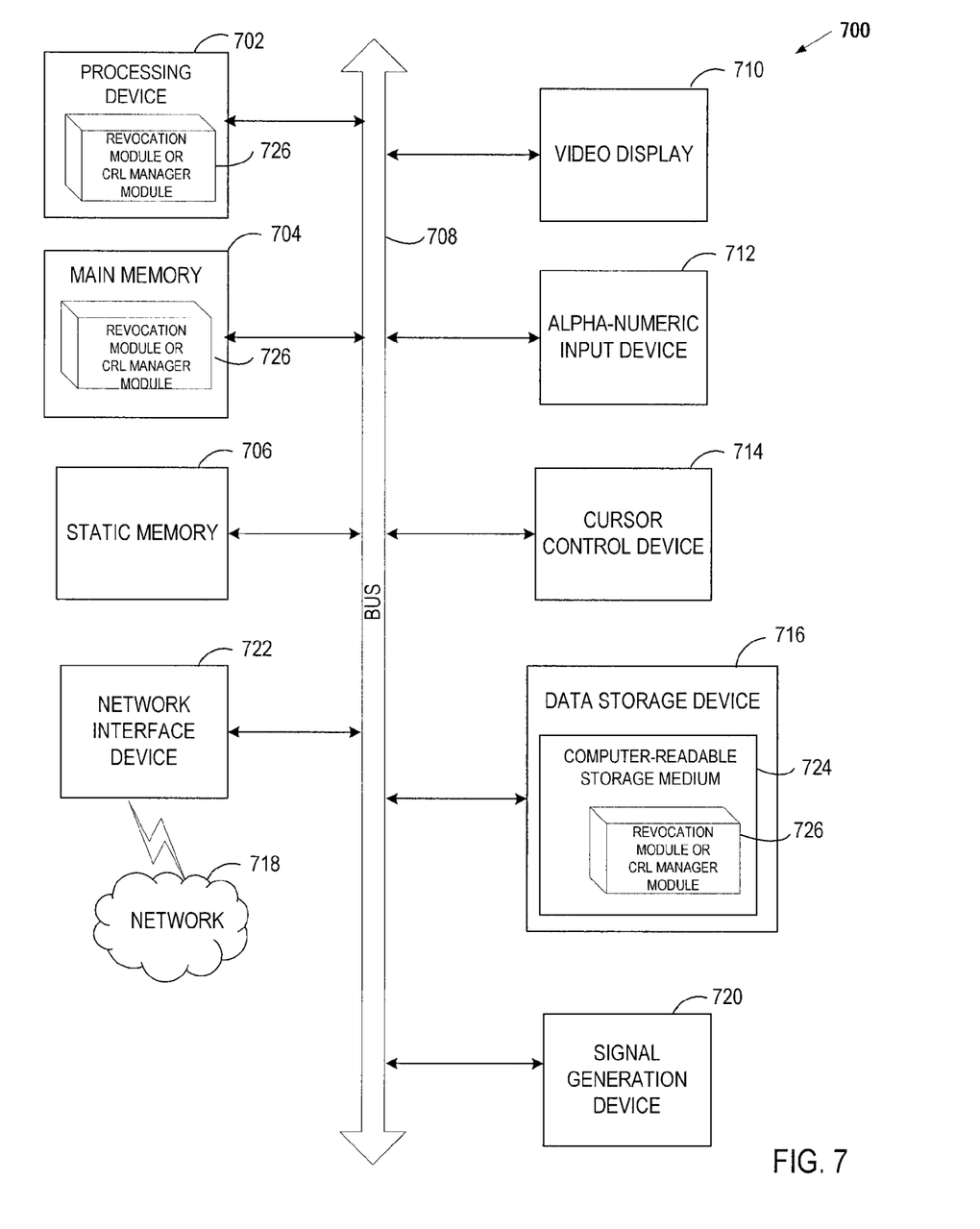
FIG. 7 is a diagram of one embodiment of a computer system for using a sub-system that has resources separate from a main CA sub-system to generate a CRL.

FIG. 7 is a diagram of one embodiment of a computer system for providing a CRL using a sub-system that has resources separate from a main CA sub-system. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the revocation module or CRL manager module 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the revocation module or CRL manager module 726) embodying any one or more of the methodologies or functions described herein. The revocation module or CRL manager module 726 may also reside, completely or at least partially, within the main memory 704 and/or within the processing device 702 during execution thereof by the computer system 700, the main memory 704 and the processing device 702 also constituting machine-readable storage media. The revocation module or CRL manager module 726 may further be transmitted or received over a network 718 via the network interface device 722.

The computer-readable storage medium 724 may also be used to store the revocation module or CRL manager module 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The revocation module or CRL manager module 726, components and other features described herein (for example in relation to FIG. 2 and FIG. 5) can be implemented as discrete hardware components or integrated in the functionality of hardware components such as ASICS, FPGAs, DSPs or similar devices. In addition, the revocation module or CRL manager module 726 can be implemented as firmware or functional circuitry within hardware devices. Further, the revocation module or CRL manager module 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating," "receiving," "generating," "providing," "sending," "detecting," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing a CRL using a sub-system that has resources separate from a main CA sub-system is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a first server computer, a command from a second server computer to update revocation data;
   generating, using computing resources of the first server computer separate from computing resources of the second server computer, updated revocation data in view of the command;
   generating, using the computing resources of the first server computer separate from computing resources of the second server computer, a certificate revocation list (CRL) in view of the updated revocation data;
   receiving a status request regarding the first server computer;
   transmitting a response for the status request, the response comprising data indicating whether the first server computer is not busy, a scheduled time for generating the CRL, an amount of time to generate the CRL and a time the CRL is last generated;
   receiving, by the first server computer, a command to override the scheduled time for generating the CRL in view of the response;
   providing, by the first server computer, the CRL to the second server computer to update certificate records stored in a data store that is coupled to the second server computer, wherein the update is to cause at least one of: a digital certificate to be generated in view of the CRL, the digital certificate to be issued, or the CRL to be published;
   receiving, by the first server computer, a command to update configuration data for the CRL stored in a cache memory that is separate from the second server computer, wherein the configuration data comprising a schedule to generate the CRL; and
   providing a status update comprising a time the cache memory is last updated.

2. The method of claim 1, wherein the computing resources of the first server computer comprises a central processing unit (CPU) that is separate from the second server computer.

3. The method of claim 1, further comprising:
   generating, using the computing resources of the first server computer separate from computing resources of the second server computer, a delta CRL in view of changes to the CRL since the time the CRL is last generated.

4. The method of claim 1, wherein receiving the command to update revocation data comprises at least one of:
   receiving, by the first server computer, a command from the second server computer to update status data in at least one certificate record that is stored in a cache that is coupled to the first server computer; or
   receiving, by the first server computer, a command from the second server computer to update configuration data that is stored in the cache that is coupled to the first server computer, the configuration data comprising data specifying elements to be included in the CRL.

5. The method of claim 1, wherein the status comprises at least one of a time the cache is updated or a time for generating the CRL.

6. The method of claim 1, wherein generating the CRL in view of the updated revocation data comprises:
receiving, by the first server computer, a command from the second server computer to generate the CRL; and
generating, by the first server computer, the CRL in response to the command from the second server computer.

7. A system comprising:
a first server computer comprising:
a first memory; and
a first processing device operatively coupled to the first memory, the first processing device to:
receive a command from a second server computer to update revocation data;
generate updated revocation data in view of the command using computing resources of the first server computer separate from computing resources of the second server computer;
generate the CRL in view of the updated revocation data using computing resources of the first server computer separate from computing resource of the second server computer;
receive a status request by the first server computer;
transmit a response for the status request comprising data indicating: whether the first server computer is not busy, whether the first server is to perform an action to generate the CRL, an amount of time to generate the CRL and a time the CRL is last generated;
receive a command to override the scheduled time for generating the CRL in view of the response;
provide the CRL to the second server computer to update certificate records stored in a data store that is coupled to the second server computer, wherein the update is to cause at least one of: a digital certificate to be generated in view of the CRL, the digital certificate to be issued, or the CRL to be published;
receive a command to update configuration data for the CRL stored in a cache memory that is separate from the second server computer, wherein the configuration data comprising a schedule to generate the CRL; and
provide a status update comprising a time the cache memory is last updated.

8. The system of claim 7, further comprises the first processing device to:
generate, using the computing resources of the first server computer separate from computing resources of the second server computer, a delta CRL in view of changes to the CRL since the time the CRL is last generated.

9. The system of claim 7, wherein the second server computer comprises:
a second memory; and
a second processing device, operatively coupled to the second memory, the second processing device to:
send the command to update the revocation data to the first processing device;
send the request to the first server computer system for the status;
receive the status from the first server computer indicating that the first server computer is generating the CRL; and
access the CRL from a data store that is coupled to the second server computer.

10. A non-transitory computer-readable medium including instructions that, when executed by a first processing device, cause the first processing device to:
receive a command from a second processing device to update revocation data;
generate, using computing resources of the first processing device separate from computing resources of the second processing device, updated revocation data in view of the command;
generate, using the computing resources of the first processing device separate from computing resources of the second processing device, a certificate revocation list (CRL) in view of the updated revocation data;
receive a status request by the first processing device;
transmit a response for the status request comprising data indicating whether the first processing device is not busy, a scheduled time to generate the CRL, an amount of time to generate the CRL and a time the CRL is last generated;
receive a command to override the scheduled time for generating the CRL in view of the response;
provide the CRL to the second processing device to update certificate records stored in a data store that is coupled to the second processing device, wherein the update is to cause at least one of: a digital certificate to be generated in view of the CRL, the digital certificate to be issued, or the CRL to be published;
receive a command to update configuration data for the CRL stored in a cache memory that is separate from the processing device, wherein the configuration data comprising a schedule to generate the CRL; and
provide a status update comprising a time the cache memory is last updated.

11. The non-transitory computer-readable medium of claim 10, wherein the computing resources of the first processing device comprise at least one of a cache memory that is separate from the second processing device or a central processing unit (CPU) that is separate from the second processing device.

12. The non-transitory computer-readable medium of claim 10, further comprising the first processing device further to:
generate, using computing resources of the first processing device separate from computing resources of the second processing device, a delta CRL in view of changes to the CRL since the time the CRL is last generated.

13. The non-transitory computer-readable medium of claim 10, wherein to receive the command to update revocation data, the first processing device is to:
receive a command to update status data in at least one certificate record that is stored in a cache that is coupled to the first processing device or
receive a command to update configuration data that is stored in the cache that is coupled to the first processing device, the configuration data comprising at least one of a schedule to generate the CRL or data specifying elements to be included in the CRL.

14. The non-transitory computer-readable medium of claim 10, wherein the status comprises at least one of a time the cache is last updated or a time for generating the CRL.

* * * * *